US009564792B2

(12) United States Patent
Cavarec et al.

(10) Patent No.: US 9,564,792 B2
(45) Date of Patent: Feb. 7, 2017

(54) ELECTRIC MOTOR AND CLOSING OR SUN PROTECTION INSTALLATION COMPRISING SUCH A MOTOR

(75) Inventors: Pierre-Emmanuel Cavarec, Mont Saxonnex (FR); Norbert Dupielet, Sallanches (FR); Frederic Maraval, Passy (FR)

(73) Assignee: SOMFY SAS, Cluses (FR)

( * ) Notice: Subject to any disclaimer, the term of this patent is extended or adjusted under 35 U.S.C. 154(b) by 412 days.

(21) Appl. No.: 14/005,812

(22) PCT Filed: Mar. 16, 2012

(86) PCT No.: PCT/EP2012/054677
§ 371 (c)(1),
(2), (4) Date: Sep. 17, 2013

(87) PCT Pub. No.: WO2012/123575
PCT Pub. Date: Sep. 20, 2012

(65) Prior Publication Data
US 2014/0009042 A1    Jan. 9, 2014

(30) Foreign Application Priority Data

Mar. 17, 2011    (FR) ...................................... 11 52200
Mar. 17, 2011    (FR) ...................................... 11 52210
(Continued)

(51) Int. Cl.
*H02K 16/02*    (2006.01)
*H02K 5/10*    (2006.01)
(Continued)

(52) U.S. Cl.
CPC ................ *H02K 16/02* (2013.01); *H02K 1/14* (2013.01); *H02K 1/185* (2013.01); *H02K 5/10* (2013.01);
(Continued)

(58) Field of Classification Search
CPC .......... H02K 16/00; H02K 16/02; H02K 1/14; H02K 1/12; H02K 1/185; H02K 1/27; H02K 15/066; H02K 15/067; H02K 11/0073; H02K 21/12; H02K 29/08; H02K 11/33; H02K 5/10; H02K 7/14; H02K 2201/12
(Continued)

(56) References Cited

U.S. PATENT DOCUMENTS 3,153,157 A    10/1964 Rabe
3,445,693 A *  5/1969 Crawshaw ............... H02K 1/17
                                                    310/154.09
(Continued)

FOREIGN PATENT DOCUMENTS

CN    1697287 A    11/2005
CN    1738157 A    2/2006
(Continued)

OTHER PUBLICATIONS

International Search Report and Written Opinion dated May 6, 2013 (and translations), which issued during the prosecution of International Patent Application No. PCT/EP2012/054677.
(Continued)

*Primary Examiner* — Terrance Kenerly
*Assistant Examiner* — Alexander Singh
(74) *Attorney, Agent, or Firm* — Troutman Sanders LLP (57) ABSTRACT

The invention relates to an electric motor having a rotor and a coiled stator, the rotor including a shaft and two disks that are rotatably fixed to the shaft and provided with permanent magnets, an outer portion of the stator extending from each disk axially parallel to a rotational axis of the rotor and radially beyond same, from the axis. The stator includes a plurality of disjointed bars made of a magnetically conductive material, certain parts of which form the outer portion (Continued)

of the stator. The stator also has a carrier structure holding the bars such that they are fixed in relation to each other, the carrier structure being mounted in such a way that it can rotate on the shaft, axially outside the two disks. The outer portion of the stator extends parallel to the rotational axis, axially outside the disks of the rotor, up to the carrier structure.

20 Claims, 7 Drawing Sheets

(30) Foreign Application Priority Data

Mar. 17, 2011 (FR) ...................................... 11 52211
Mar. 17, 2011 (FR) ...................................... 11 52215

(51) Int. Cl.
| | |
|---|---|
| *H02K 7/14* | (2006.01) |
| *H02K 1/14* | (2006.01) |
| *H02K 21/12* | (2006.01) |
| *H02K 29/08* | (2006.01) |
| *H02K 1/18* | (2006.01) |

(52) U.S. Cl.
CPC ................. *H02K 7/14* (2013.01); *H02K 11/33* (2016.01); *H02K 21/12* (2013.01); *H02K 29/08* (2013.01); *H02K 2201/12* (2013.01)

(58) Field of Classification Search
USPC ............ 310/156.01–156.15, 156.34–156.43, 310/156.46, 156.59, 156.62, 156.49, 310/156.56, 156.25, 114, 180, 181, 46, 310/216.039, 89
See application file for complete search history.

(56) References Cited

U.S. PATENT DOCUMENTS

| | | | |
|---|---|---|---|
| 4,556,809 A | 12/1985 | Beisse et al. | |
| 4,578,608 A | 3/1986 | Mech et al. | |
| 4,751,415 A * | 6/1988 | Kitamori | H02K 29/08 310/156.01 |
| 5,736,806 A | 4/1998 | Taghezout | |
| 6,844,656 B1 | 1/2005 | Larsen et al. | |
| 7,425,121 B2 * | 9/2008 | Wood | F01C 21/08 310/103 |
| 2006/0087186 A1 * | 4/2006 | Wasson | H02K 1/14 310/114 |
| 2006/0087188 A1 | 4/2006 | Petro et al. | |
| 2007/0126303 A1 | 6/2007 | Petro et al. | |

FOREIGN PATENT DOCUMENTS

| | | |
|---|---|---|
| DE | 7018060 U | 8/1970 |
| DE | 10140362 A1 | 3/2003 |
| DE | 10 2006 038576 A | 4/2008 |
| EP | 0158227 A1 | 10/1985 |
| EP | 1075072 A1 | 2/2001 |
| EP | 1675251 A1 | 6/2006 |
| GB | 2379093 | 2/2003 |
| JP | 2003-088068 A | 3/2003 |
| JP | 2006-074909 A | 3/2006 |
| WO | 00/48297 A1 | 8/2000 |
| WO | 2009/015496 A1 | 2/2009 |

OTHER PUBLICATIONS

French Search Report dated Oct. 26, 2011, which issued during the prosecution of French Patent Application No. 1152210.
French Search Report dated Oct. 26, 2011, which issued during the prosecution of French Patent Application No. 1152200.
French Search Report dated Oct. 28, 2011, which issued during the prosecution of French Patent Application No. 1152211.
French Search Report dated Oct. 26, 2011, which issued during the prosecution of French Patent Application No. 1152215.

* cited by examiner

ELECTRIC MOTOR AND CLOSING OR SUN PROTECTION INSTALLATION COMPRISING SUCH A MOTOR

CROSS-REFERENCE TO RELATED APPLICATIONS

The present application is a National Stage of International Application PCT/EP2012/054677 (the "PCT application") filed Mar. 16, 2012. The PCT Application claims priority to French Patent Application Nos. 1152210, 1152200, 1152211, 1152215, all filed Mar. 17, 2011. The PCT application published as WO 2012/123575 on Sep. 20, 2012. All applications are herein incorporated by reference.

TECHNICAL FIELD

The invention relates to the field of electromechanical actuators allowing for the motorized control of elements for blocking or protecting from the sun in a building, such as blinds. In particular, it relates to a motor of which the radial dimensions are reduced in order to be integrated into a tubular actuator.

The invention relates in particular to the field of low-power electronic switching synchronous electric motors. Such motors must have a substantial torque with small radial dimensions, allowing them to be integrated into a blind winding tube or in a box with a substantially rectangular cross-section, for example a rail of Venetian blinds.

These particular dimensions encourage the production of long motors, with the length of the motor compensating for its small section in order to obtain the power needed to drive the element for blocking or protecting from the sun.

BACKGROUND

The motors currently used for these applications are brushed direct current (DC) motors, comprising a coiled rotor and a ferrite permanent magnet stator. The rotor is connected to a rotary collector. The current is injected via the brushes at the collector. This type of motor is commonly replaced with brushless motors, which operate without brushes. The latter include a coiled stator while the magnets are placed on the rotor. An electronic control system must provide the switching of the current in the stator windings.

This type of motor is used in particular in model aircraft, for DVD readers/burners or for small fans.

It is known in U.S. Pat. No. 4,556,809 to provide the rotor of an electric motor with discs provided with magnets intended to cooperate with a stator, extending in the form of a cylinder around the discs of the rotor. The thickness of the stator increases the radial width of the motor.

Application JP-A-2003/088068 describes an electric motor or dynamo comprising two rotor discs mounted on the same shaft, and between which is placed a set of bars each provided with a copper winding in order to form the stator. The permanent magnets are placed facing the windings on the surfaces of the rotor discs turned towards each other. The arrangement chosen aims to improve the complex method of producing windings, in particular the aforementioned cylindrical stator, and makes it possible to reduce production waste. A stacking of two structures one over the other makes it possible to produce a substantial quantity of electricity.

The structure shown in this document is not however adapted to be integrated into an actuating tube, these axial and radial dimensions are practically equivalent in the case of a simple structure. The stacking of two structures makes it possible to produce a motor that is more elongated but the objective of this stacking is not to reduce the radial dimensions, but to produce a more substantial quantity of energy.

It is known in DE-A-10 2006 038576 to longitudinally juxtapose, along a rotational axis of a rotor, the phases of an electric motor. This makes it possible to reduce its diameter but to the detriment of the length of the motor, as the latter is constituted of a succession of blocks each comprising a coil and the two corresponding bearings, in order to constitute each phase of the motor. Moreover, the coil being wound around a shaft of the rotor, the method of manufacture and assembly is complex.

The invention therefore proposes to improve the existing devices in order to define an electric motor structure dedicated to tubular actuators with the following objectives:
- reduced dimensions, in particular with regards to the radial dimensions
- improvement of the sound level
- production of torque at a reduced speed with rotor inertia
- facility of winding.

SUMMARY

To this effect, the invention relates to an electric motor having a rotor and a coiled stator, the rotor including itself a shaft and two discs mounted fixed in rotation on the shaft and provided with permanent magnets, while an external portion of the stator extends on each disc, axially parallel to a rotational axis of the rotor and radially beyond the latter. In accordance with the invention, the stator has a plurality of disjointed bars which are made from a magnetically conductive material and of which certain portions form the outer portion of the stator, as well as a carrier structure maintaining the bars fixed in relation to the others, the carrier structure being mounted with the possibility of rotation on the shaft, axially to the exterior of the two discs. Furthermore, the outer portion of the stator extends, parallel to the rotational axis of the rotor, axially to the exterior of the discs, up to the level of the carrier structure.

The mounting of the motor is facilitated in the sense that the bars of the stator can be installed independently of one another in the carrier structure around the rotor, during the assembly of the motor. Furthermore, bearings supporting the rotor in relation to the stator can be arranged to the exterior of the magnetic flow zone between the rotor and the stators, which prevents disturbances, these bearings can therefore be metal bearings. The mounting of the structure, and in particular bearings supporting the latter, to the exterior of discs is also simpler than a mounting on the shaft between the discs. As the outer portion formed by the conductive bars extends axially to the exterior of the discs and to the carrier structure, this outer portion fulfils the magnetic function allowing for the closing of the magnetic flow according to a radial direction across from the permanent magnets as well as a mechanical function for bearing on the carrier structure.

According to advantageous but not mandatory aspects of the invention, such a motor can incorporate one or several of the following characteristics, taken in any technically permissible combination:
- The permanent magnets are arranged with their direction of polarity oriented radially in relation to the rotational axis. Thanks to this aspect of the invention, a radial magnetic flow is created between each disc of the rotor and the portions with regards to the stator, which generates self-centering forces which make it possible to maintain the rotor in position in relation to the stator, along the rotational axis of the rotor. This facilitates mounting and makes it possible to limit the stresses on the bearings supporting the rotor, while still minimizing the vibrations produced. In addition, the power of the motor is optimized by the placing of the magnets and of the gap between rotor and stator at the largest diameter.

The magnets of one of the discs are arranged in opposition in relation to the magnets of the other disc.

The magnets are arranged on the external periphery of the discs of the rotor.

The external periphery of the discs of the rotor is polygonal, having planar zones for the positioning of magnets of parallelepiped shape.

The external periphery of the discs of the rotor is substantially circular, and the magnets have a curved structure.

Sensors are positioned directly across from the magnets.

Sensors are arranged in an alternating manner, between two stator bars.

At least some of the metal bars are elbowed and support coils, the coils being at least partially inserted into a cylindrical space arranged, along the axis, between the discs of the rotor and having a diameter equal to the diameter of these discs. Thanks to this aspect of the invention, the maximum diameter of the motor can be reduced thanks to the locating of at least one portion of the rotor in the cylindrical space mentioned hereinabove. The invention proceeds with an optimization of the internal space of the motor, between the two discs of its rotor, in order to house therein a portion of the stator, more particularly the coils.

The length of the coils, measured parallel to the rotational axis of the rotor, is independent of the length of the magnets, measured parallel to this axis.

The internal portion of the stator has at least one coil wound around a bar made of magnetic material which also defines one portion at least of the outer portion of the stator.

The bar supporting the coil is elbowed in a direction where it offsets the coil towards the rotational axis of the rotor, in relation to the outer portion of the stator.

Each coil is centered on an axis parallel to the rotational axis and offset radially in relation to the latter, each coil being arranged in an angular sector in relation to the rotational axis.

The outer diameter of the motor is substantially equal to the maximum diameter of the rotor increased by twice the maximum thickness of an external portion of the stator and by twice the gap between this external portion and the rotor.

The internal portion of the stator extends fully in a cylindrical space arranged along the axis, between the discs and having a diameter equal to the outer diameter of the motor.

The stator has metal bars, parallel to the rotational axis of the rotor and which do not support any coil.

The stator has in alternation elbowed bars each supporting a coil offset towards the rotational axis and straight bars that do not support any coil.

The carrier structure is mounted on pre-tensioned bearings on the rotor shaft, against the rotor discs.

The carrier structure is in two portions nesting into one another, parallel to the rotational axis of the rotor.

The carrier structure is provided with localized recesses for the passage of the portions of sensors and/or the maintaining of metal bars belonging to the stator.

The carrier structure has studs surrounding a portion of certain metal bars at least, for the absorption of radial forces.

The carrier structure has inserts made of material that absorbs the vibrations on localized recesses or on studs.

The motor has at least one elastic seal, in particular an O-ring seal, of which the outer diameter is larger than the outer diameter of the carrier structure, with the latter including at least one groove wherein the seal can be positioned.

The motor has a casing wherein the carrier structure provided with the stator and the rotor is inserted.

The bars have a section adapted to the magnets in such a way that a gap with a substantially constant thickness is arranged between a bar and a magnet when they are facing each other.

The bars are formed from the stacking of machined steel plates.

The metal bars are of two separate types, arranged alternating around the rotational axis. Thanks to this aspect of the invention, the two types of bars make it possible to distribute coils belonging to the stator around the rotational axis of the rotor with a good radial compactness of the motor, in relation to this axis.

Only some of the bars support an individual coil.

A first type of bar extends along a straight line parallel to the rotational axis of the rotor.

A second type of bar has an external portion extending along a straight line parallel to the rotational axis of the rotor and an internal portion elbowed in relation to the external portion.

The bars have at least one zone with lesser radial thickness, on their portion of positioning on the carrier structure and/or to the right of the discs of the rotor.

The outer diameter of the carrier structure is less than or equal to the outer diameter of the stator.

Moreover, the invention relates to a closing or sun protection installation including a closing screen and a motorization unit as well as a motorization unit including a motor such as mentioned hereinabove.

Such an installation is more economical to manufacture and simpler to put into service than those of prior art.

DETAILED DESCRIPTION

Figure 1:
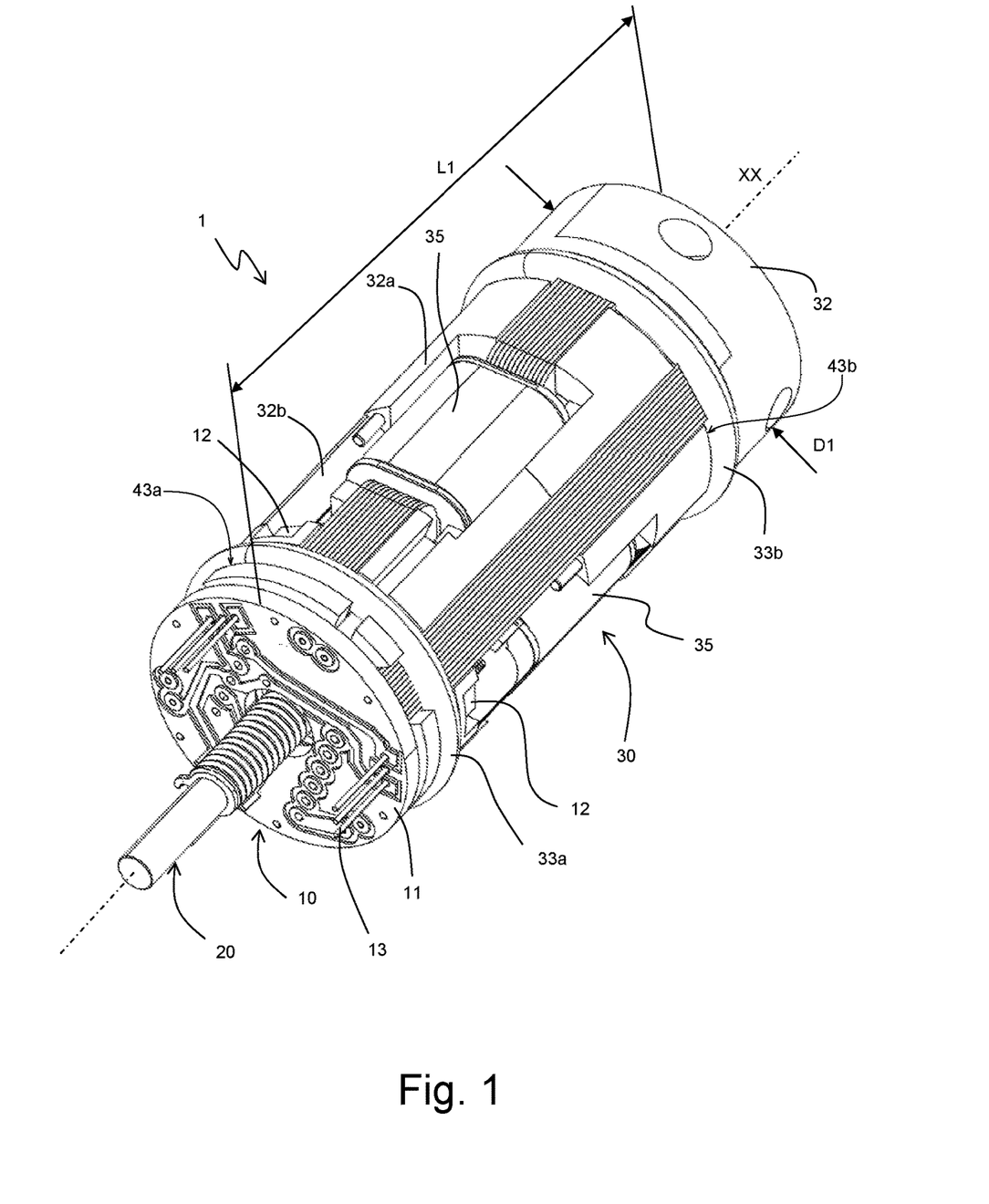
FIG. 1 shows general view in perspective of a motor according to an example of the invention.

The motor 1, in accordance with an example of the invention and shown in the figures, is a synchronous brushless motor. It has an electronic control unit 10, a rotor 20 as well as a stator 30. The motor has an elongated structure. Its length L1, measured parallel to a rotational axis XX of the rotor 20, is at least equal to twice its maximum diameter D1 measured radially in relation to this axis. In particular, a motor of diameter D1 equal to approximately 22 mm, for a length L1 from 45 to 50 mm can be particularly well adapted for driving an interior blind. The electronic control unit 10 has a printed circuit 11 located in one of the ends of the motor and a set of sensors 12, for example Hall effect sensors, arranged inside the structure of the motor 1 and mounted on the printed circuit 11 thanks to lugs 13. The sensors can be similar.

Each component 20 and 30 of the motor is shown and described independently hereinafter.

Figure 2:
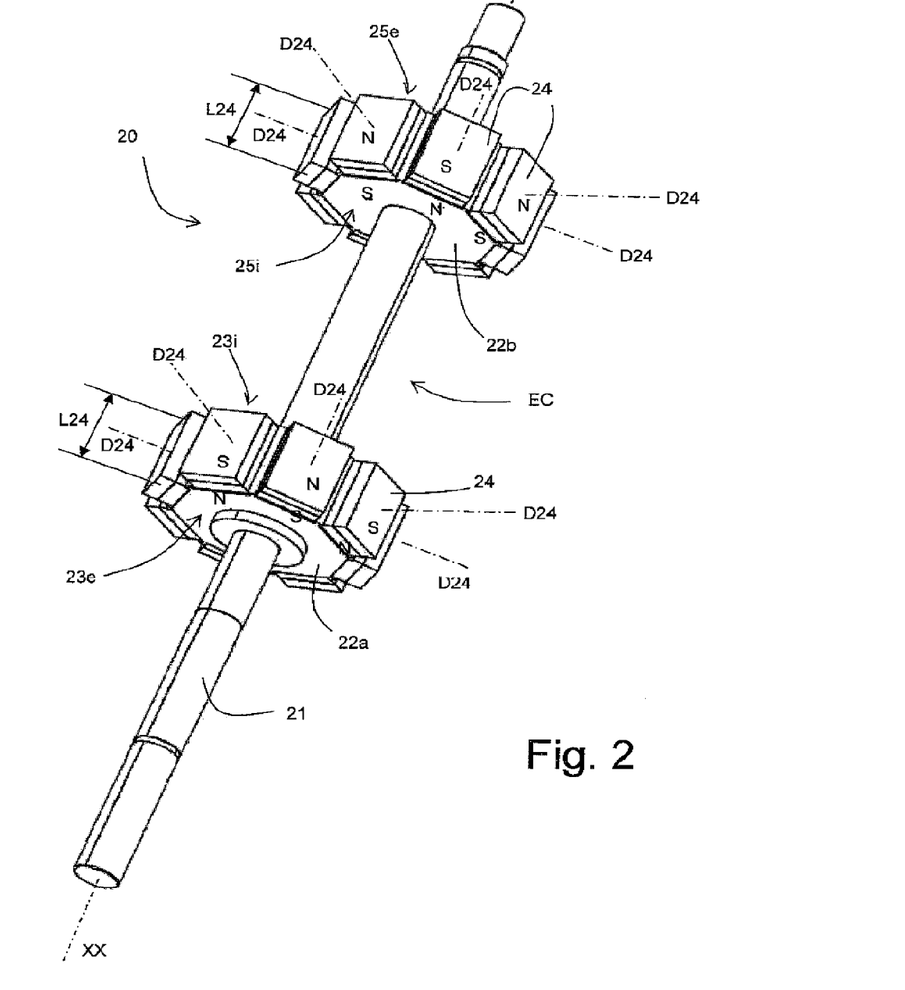
FIG. 2 shows an isolated view in perspective of the rotor of the motor of FIG. 1.

The FIG. 2 shows an embodiment of the rotor 20. The rotor has a structure in the shape of a "dumb-bell", including a rotor shaft 21 as well as two rotor discs 22a and 22b mounted on the shaft. The term "disc" here designates an annular structure of cylindrical shape, of which the axial thickness can be small compared to its diameter, in practice less than 50%, more preferably less than 25% of this diameter. The two discs are fixed in rotation on the shaft. The rotor shaft defines the longitudinal axis XX of the motor. The various elements including the motor are centered around this axis XX which is also the rotational axis of the rotor 20. The rotor shaft 21 defines, at one of its ends, the output shaft of the motor 1.

Each rotor disc 22a or 22b has a set of magnets 24 in even numbers. The magnets are oriented radially, in such a way as to create substantially radial flows. In other terms, a straight line D24 ranging from the North pole to the South pole of a magnet, which represents the direction of polarity of this magnet, extends according to a radial direction in relation to the axis XX. The poles N and S of some of the magnets are indicated in FIG. 2 in order to indicate the direction of polarity of the magnets. The magnets of each disc are arranged successively in opposition. The poles of two adjacent magnets 24 of the same disc have opposite configurations. As such, when a magnet has its North pole directed towards the axis XX and its South pole opposite, the two adjacent magnets have their South poles directed towards the axis XX and their North poles opposite, and reciprocally. The magnets of the two discs are also arranged in opposition in relation to one another. In other terms, two magnets 24 located in the same angular sector of the discs 22a and 22b in relation to the axis XX have their poles in opposite configuration.

L24 denotes the axial length of a magnet 24, i.e. its dimension according to the axis XX. The latter is substantially equal to the axial thickness of the discs of the rotor. This dimension is smaller in the case of the use of a neodymium magnet in relation to a ferrite magnet, but these different solutions can be considered.

Note that the surfaces of the magnets turned opposite the shaft 21 are parallel to the axis XX. In other terms, the average diameter of a disc 22a or 22b provided with its magnets 24 is constant according to a direction parallel to the axis XX.

In this example, the magnets are rectangular. They can be mounted on an internal surface 23i, 25i of a disc turned towards the other disc or on the outer edge 27 of each disc, as shown in FIG. 2. In this case, the outer edge of each disc is not circular, but polygonal and has planar zones for the positioning of the magnets 24 which are of parallelepiped shape. This configuration limits the axial dimensions required for the mounting of magnets and allows for the use of simple magnets available off-the-shelf.

Alternatively, the external periphery of the discs 22a and 22b is substantially circular and the magnets 24 have a curved structure adapted to this periphery. In another alternative example, the external periphery is covered by a magnetic material, in such a way as to form an annular single-block magnetization, having the same properties as the plurality of magnets described hereinabove.

In addition, the radial orientation of the magnets of the rotor creates a substantial radial magnetic flow F, which is directly captured by all of the sensors 12 of the electronic control unit 10. The sensors 12 are arranged directly across from the magnets 24. The sensors 12 can be aligned with the magnets 24 according to a direction parallel to the axis XX. Alternatively, other means for detecting the rotation of the rotor can be set in place, for example an encoder, if it is considered to not mount sensors on the motor structure. The flow F also interacts with the stator 30, as explained hereinbelow, in particular in liaison with the FIG. 6.

Figure 4:
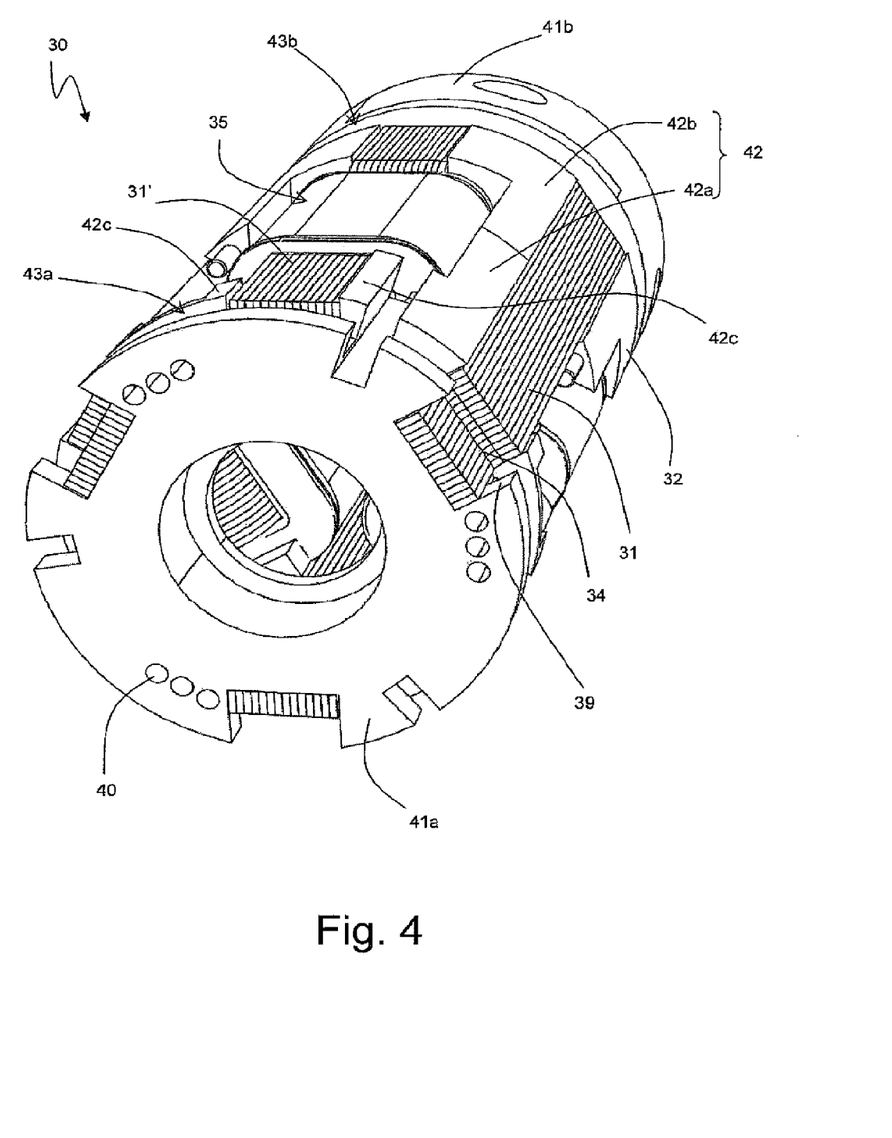
FIG. 4 is an isolated view in perspective of the stator of the motor.

The magnetic stator 30 has several disjointed stator bars 31, 31', i.e. independent of each another, mounted substantially parallel to the axis XX of the motor and distributed evenly around this axis. The bars are maintained by a support structure or carrier structure 32 preferably into two portions 32a and 32b, axially nesting into one another. The carrier structure is maintained in place around the shaft 21 of the rotor 20, with the possibility of relative rotation, by means of pre-tensioned bearings 50 on the shaft 21. These bearings are pre-tensioned axially and located as close as possible to the rotor discs in order to better support the radial forces, as close as possible to the section where they are generated, and to the exterior of the latter, in other words on the side of the external surfaces 23e, 25e of the discs 22a and 22b, thus rendering the structure rigid. In practice, the bearings 50 are mounted against the external surfaces 23e and 25e of the discs 22a and 22b. The carrier structure 32 makes it possible to limit the risks of bending of the rotor shaft if the latter is elongated, in that the length able to bend is limited.

Figure 5:
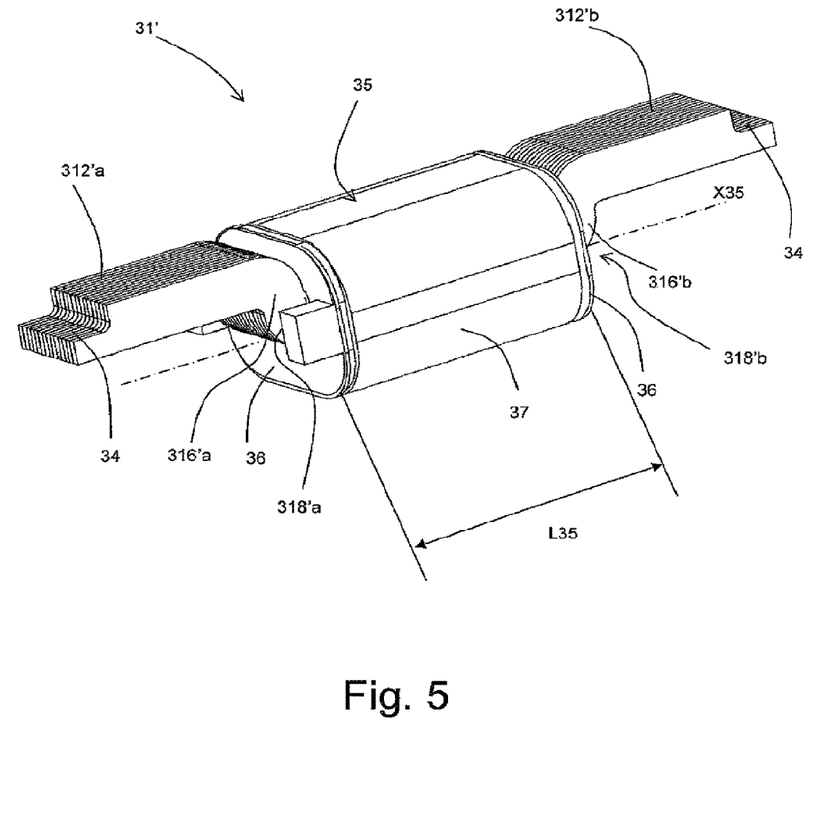
FIG. 5 is an isolated view in perspective of a portion of the stator taking the form of an elbowed bar.

The different bars 31, 31' of the stator are comprised of packets of assembled plates and provided at their ends with an indentation 34. This indentation 34 has a zone with lesser radial thickness, with regards to the axis XX, in relation to the other portions of the bars 31 and 31'. This indentation has the portion by which the bars 31 and 31' are positioned on the carrier structure 32. Alternatively or as a complement, zones with lesser radial thickness can be provided in the bars 31 and 31' to the right of the discs 22a and 22b, i.e. on the same level as these discs along the axis XX.

The indentations 34 allow for a portion of the carrier structure 32 radially surrounding the portions 312a, 312b, 312'a, 312'b of the bars 31 and 31' without increasing the maximum diameter of the structure 32 or the outer diameter D1 of the motor in relation to the maximum radial distance between the bars 31 and 31' and the axis XX. As such, the diameter of the carrier structure 32 can be substantially equal, even less than, that of the stator 30.

Alternatively, the bars 31 and 31' can be made out of a magnetically conductive material other than the steel plate.

A portion of the bars 31 and 31' of the stator 30 extends across from the magnets 24, parallel to the axis XX and on each disc of the rotor, arranging a gap E between them and the magnets. 312a and 312b denote respectively the portions of the bars 31 which are arranged axially, along the axis XX, on magnets 24 of the discs 22a and 22b. In the same way, 312'a and 312'b denote the portions of the bars 31' which are arranged axially, parallel to the axis XX, on magnets 24 of the discs 22a and 22b. The portions 312a, 312b, 312'a and 312'b are arranged radially beyond magnets 24, in relation to the central axis XX.

At least on magnets 24, the portions 312a, 312b, 312'a and 312'b have a section suitable for maintaining a constant gap E facing magnets 24. In particular, for rectangular magnets arranged on adjacent planar surfaces made at the outer circumference of each disc of the rotor, the bars are substantially parallelepiped.

In the case where the magnets at the circumference of the discs of the rotor form an annular surface, the packets of plates including bars 31 and 31' can be machined and assembled in such a way as to form a section of bar substantially in the shape of an arc of circle, in such a way as to maintain a gap E constant with the magnets at the external periphery of the discs. This other example is not shown.

The bars 31 and 31' can be distributed into two categories: those of a first type 31 are parallel to the axis XX of the motor and are substantially straight. Those of a second type 31' are each used as a support for a coil 35 belonging to the stator 30. Each coil 35 is comprised of a copper winding 37 between two flanges 36. The bars 31' supporting the coils are more preferably elbowed, with a straight portion 314' offset towards the axis XX. More precisely, each bar 31' has two connecting portions 316'a and 316'b slanted in relation to the axis XX and which respectively connect the portions 312'a and 312'b to the portion 314' which is parallel to the axis XX. A coil 35 is mounted around each portion 314'. The coils 35 are as such offset towards the axis XX of the motor, in relation to the outer diameter of the discs 22a and 22b. This decreases the maximum diameter D1 of the motor in relation to the case where the bars 31' would be straight.

Once the assembly of the stator 30 completed, the coils 35 are flush with the external surface of the support structure 32. In addition, the elbows 318'a, 318'b of the bars 31', which connect the portions 316'a and 316'b to the portion 314', maintain the flanges 36 and the windings 37 in place on these bars, without any other fastening part being required.

L35 denotes the axial length, measured parallel to the axis XX, of a coil 35.

In practice, the stator has six stator bars 31 and 31', of which three only, i.e. the bars 31', support coils 35. The use of a stator with three or six coils allows for reduced oscillations of torque in relation to a 2-phase structure. The ratio between the number of magnets 24 and the number of coils 35 is a piece of data known to those skilled in the art. Here, there are eight magnets for three or six coils.

X35 denotes the central winding axis of a coil 35. This axis is parallel to the axis XX and offset radially in relation to the latter, in such a way that each coil 35 is arranged, in relation to the axis XX, in an angular sector separate from the one that receives the bars 31 or the other coils 35.

The coiled bars 31' are arranged, around the axis XX, alternating with the non-coiled bars 31. Alternatively and if the diameter D1 allows, all of the bars support coils.

The volume occupied by the coils 35 is located at least partially axially between the discs 22a and 22b, which makes it possible to reduce the maximum diameter D1 of the motor 1, while the supports of these coils, i.e. the stator bars 31', are maintained in part outside of this volume.

The two portions 32a, 32b of the carrier structure 32, made of non-magnetic material, each include a support cylinder 41a, 41b and half-arms 42a, 42b, of which some are nested, parallel to the axis XX, in those of the other portion in order to form arms 42 surrounding at least partially some of the stator bars 31 and 31'. The cylinder 41a, 41b of each portion 32a, 32b has a peripheral groove 43a, 43b and housings 39 for the ends of the stator bars 31. The housings 39 are located either at the periphery of the cylinder 41a or 41b of the support structure 32, or at the bottom of a groove. The ends of the bars 31, in particular the indented ends of lesser radial thickness, are inserted into these housings in order to allow for an absorption of the rotation forces. The latter are therefore absorbed as close as possible to the bearings, with the support cylinders 41a and 41b covering the bearings 50.

The grooves 43a and 43b can receive O-ring seals 33a and 33b which participate in maintaining the structure and in suspending it in a motor casing not shown. For this, the section of the seals is slightly greater than the depth of the grooves, in such a way that the seals exceed the latter. In other words, the outer diameter of the seals is greater than that of the support structure.

The arms 42a and 42b also participate in absorbing forces, but are not indispensable, as the distance between the cylinders 41a and 41b of the two portions of the support structure 32 can be simply set by the length of the stator bars 31.

Similarly, the ends of the bars 31' are also held in rotation by the support structure. In order to not excessively weaken the support cylinders, it is provided that these bars be maintained by studs 42c extending from a support cylinder 41a or 41b to the other support cylinder. These studs form two-by-two, as previously, housings for maintaining the ends of the bars 31' and allow for the absorption of radial forces exerted by these bars. Alternatively, all of the stator bars 31 and 31' could be maintained in the same way.

Figure 3:
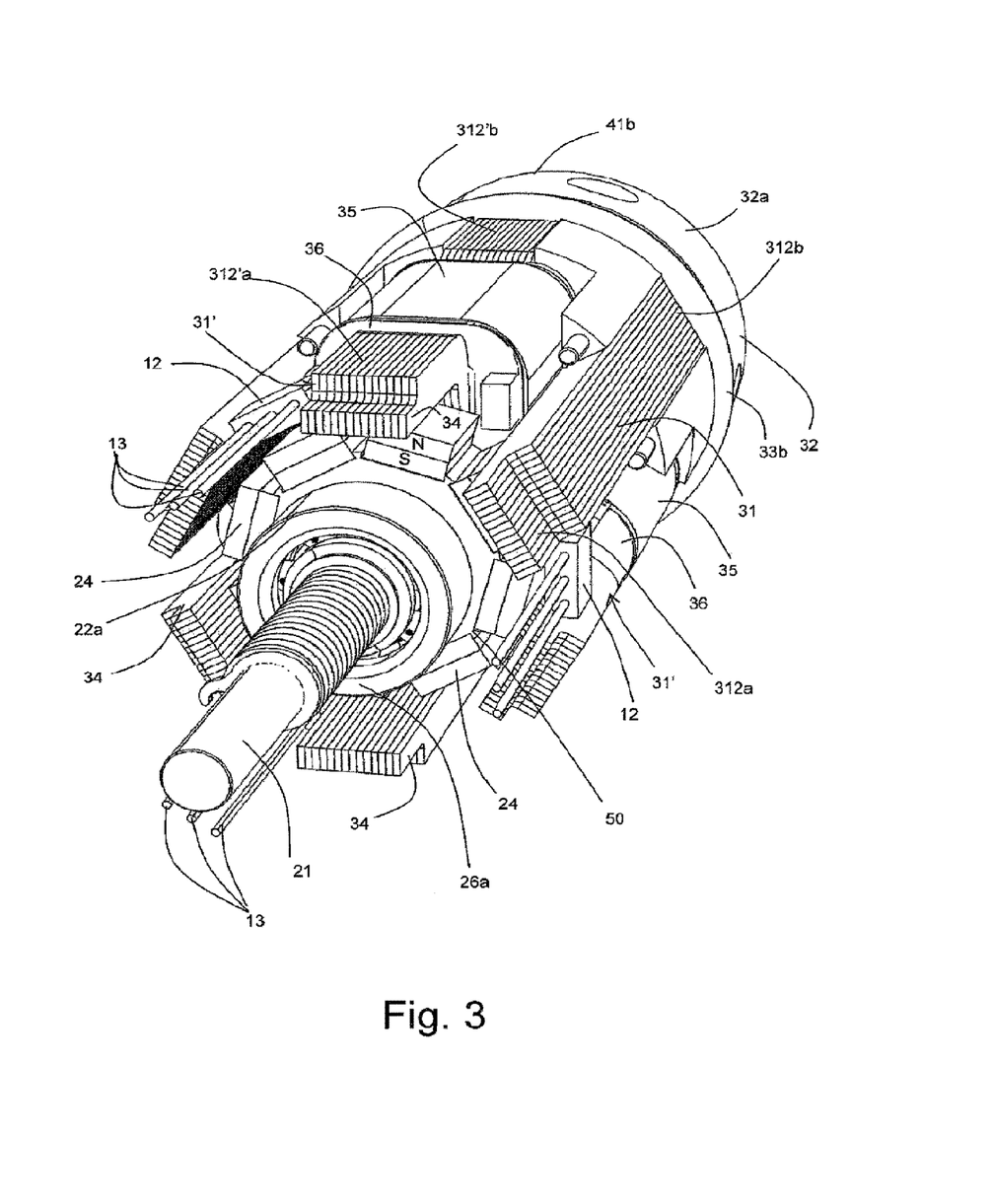
FIG. 3 shows a partial view in perspective of the motor of FIG. 1 making it possible to view the interior arrangement of the various parts of the motor, such as bearings, sensors, magnets and the rotor.

The cylinder 41a further has orifices 40 for the passage of the lugs 13 of the sensors 12 from the printed circuit to the magnets 24 of the rotor. Alternatively, portions of sensors 12 other than their lugs pass through the openings 40. The sensors 12 are arranged in an alternating manner, between two ends of stator bars, thus preventing any extra material on their arrangement in the motor 1.

Figure 6:
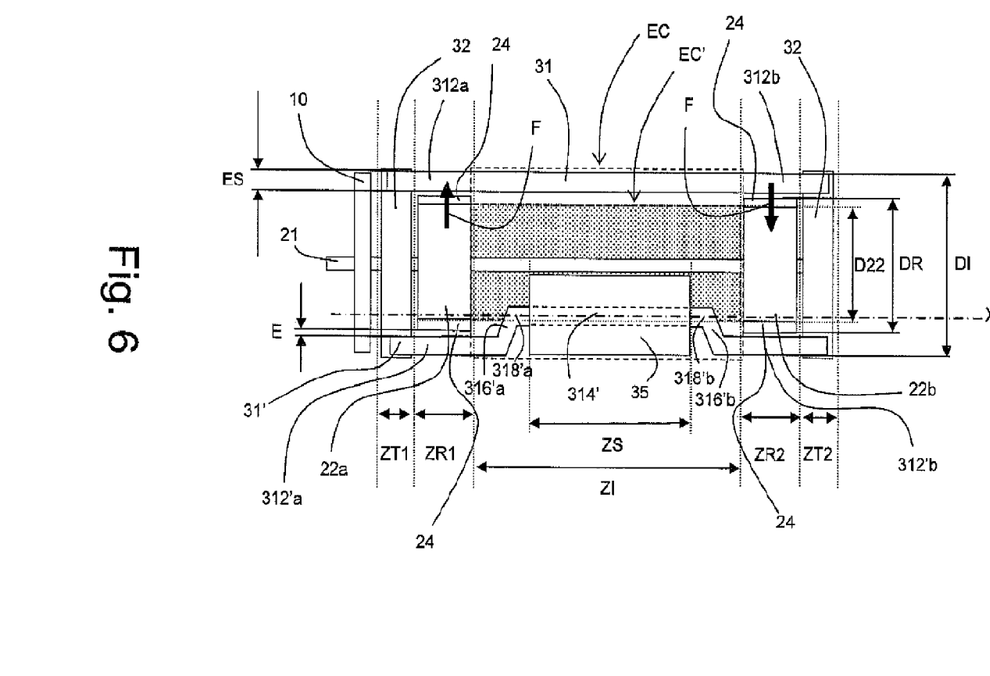
FIG. 6 is a diagrammatical axial cross-section of a portion of the elements of the motor.

FIG. 6 makes it possible to better understand the arrangement of the elements including the structure of the motor 1 and the flow that stem from it.

In particular, the following measurements and zones are defined and represented:

The ideal diameter DI of the motor 1 is equal to the sum of the maximum diameter DR of the rotor 20 (diameter of a rotor disc and thickness of the magnets), twice the maximum thickness ES of a portion 312a, 312b, 312'a or 312'b of a bar 31 or 31' of the stator 30, on discs 22a and 22b, and twice the gap E. It is therefore governed by the equation $$DI = DR + 2 \times ES + 2 \times E$$

This ideal diameter DI can be equal or slightly less than the maximum outer diameter D1 of the motor without its casing. Indeed, this ideal diameter DI can be increased, by a slight amount of extra material of the support structure 32 in relation to the stator bars 31 and 31' and/or of a portion of the section of the O-ring seals 33a and 33b, in order to define the diameter D1.

The section of the windings 37 do not take part in this diameter calculation, in that the coils 35 are entirely integrated into the cylindrical space EC defined between the rotor discs 22a and 22b, along the axis XX. This cylindrical space EC is centered on the axis XX of the rotor shaft 21. It is delimited at its ends by the two internal surfaces 23i and 25i of the discs 22a and 22b and has for diameter the ideal diameter DI defined hereinabove.

A space EC' is defined between the rotor discs 22a and 22b, along the axis XX. This cylindrical space is also centered on the axis XX and delimited at its ends by the surfaces 23i and 25i. It has for diameter the nominal diameter D22 of the discs 22a and 22b, without the magnets. The space EC' is shown in gray in FIG. 6. It is included in the space EC.

A portion of the stator, i.e. the stator bars 31 and 31', more precisely their portions 312a, 312b, 312'a and 312'b, extends to the right of the discs 22a and 22b, and is extended on either side of each rotor disc, opposite the space EC, in order to be maintained outside of the rotor discs.

Another portion of the stator 30, i.e. the portions 314', 316'a, 316'b of the stator bars 31 and the coils 35, which can be qualified as internal, is partially housed in the space EC', i.e. between the discs 22a and 22b and closer to the axis XX than the magnets 24.

Alternatively, the totality of the internal portion of the stator can be received in the space EC'.

As such, along the axis XX of the motor can be defined a first zone ZT1 for mechanical strength of the bars 31 and 31', a first zone ZR1 of rotor disc, an internal zone ZI (wherein is located a stator winding zone ZS), joining the internal surfaces of the rotor discs and of which the length corresponds to the spaces EC and EC', then a second zone ZR2 of rotor disc and a second zone ZT2 for mechanical strength.

Two arrows symbolize in FIG. 6 a portion of the flow F flowing between the magnets 24 of the rotor 20 and the bars 31 and 31' of the stator 30. This radial flow is conducted along metal bars, from one disc 22a or 22b to the other disc. The losses of flow are very low due to the presence of preferred flow paths constituted by the bars 31 and 31' and by the absence of other conductive elements, for example of support elements for the stator in the cylindrical space EC, which could disturb this flow.

Indeed, if the bearings were arranged in this space, they could interact with the magnetic flow, except if non-magnetic bearings were used, for example ceramic bearings, which are more expensive.

The coils 35 are located primarily in the rotor cylindrical space EC and partially in the space EC', but in a plane different from that of the rotor discs 22a and 22b. The rotor 20 and the stator 30 can therefore be dimensioned in a partially independent way: their sections and lengths can be dimensioned independently. In particular, the length of the coils 35, along the axis XX, can be adapted without modifying the diameter D1 of the motor 1. The number winding turns 37, and therefore the value of Amp·tr, can therefore be increased in order to increase the torque obtained on the rotor. The axial thickness of the rotor discs 22a and 22b, and therefore of the magnets 24 can also be adapted to increase the flow F. In other terms, the axial length L35 of the coils 35 is independent of the geometry of the rotor, in particular of the axial length L24 of the magnets 24, and vice-versa.

As such, the invention provides the designer of an electric motor with a great degree of freedom when choosing the length of the windings 37 and when choosing the width of the magnets 24, which makes it possible to adjust the torque induced on the rotor and the magnetic flow transmitted between the stator 30 and the rotor 20. Using the same base configuration and for the same maximum diameter D1, it is therefore possible to obtain a range of several output torques for the motor. The motor 1 therefore has a very interesting modular structure, which is particularly advantageous for the production of a range of different motors, with the same maximum diameter D1.

Furthermore, by varying the nominal diameter D22 or the outer diameter DR of the discs 22a and 22b, it is also possible to vary the output torque of the motor which is proportional to the square of this diameter.

The gap E, made between the bars 31 and 31' of the stator 30 and the magnets 24 of the rotor 20, when they are arranged radially on the periphery of the discs, is located at the largest radius possible in relation to the outer diameter D1 of the motor, which makes it possible to optimize the torque provided by the motor 1 in relation to the outer diameter D1 of the motor. It can be adjusted easily due to the highly reduced functional dimensioning.

This configuration also has the advantage, in addition to the compactness of the motor 1 which is mentioned hereinabove, a good distribution of the electromagnetic fields according to radial and axial directions. In particular, the radial orientation of the magnets in opposition creates a set of self-centering forces on the rotor 20, which makes it possible to stabilize the structure of the motor 1, in particular in the case where the number of magnets and the number of bars of the stator are even numbers. These forces contribute to better strength of the parts in relation to one another and facilitate the mounting and the insertion of the internal structure of the motor in an external cylindrical casing not shown.

The multiplication of the parts constituting a motor structure such as described, although it facilitates the mounting and the production of the motor, also increases the risks of inducing parasite vibrations which generate noise. The following solutions participate in the improvement of the acoustic performance of the motor, in particular in reducing the noise generated during the operation:

- The magnetic forces participate themselves in the maintaining of the structure: the axial flows between parts are minimized, to the benefit of radial flows F. The possible axial or radial forces are countered by the presence of bearings 50, as close as possible to the location where these forces are generated. The pre-tensioning of the bearings also makes it possible to decrease the axial clearances.
- The coaxial structure of the motor 1 has a reduced functional dimensioning, the radial forces and clearances are therefore better controlled.
- The O-ring seals 33a and 33b make it possible to construct a self-carried structure and to create a zone for absorbing vibrations when the structure of the motor is mounted in a casing. They are inserted on indentations 34 provided at the ends of the stator bars 31 and 31' and which form a retaining groove for the O-ring seals. Therefore, the inner diameter required of the casing motor is slightly greater than the diameter of the structure DI.
- It is also possible to provide to wedge the ends of the stator bars on their housings 39 in the support structure 32, by using a material that absorbs the vibrations and/or by reducing the mounting clearances.

Moreover, the following solutions participate in the improvement of the performances of the motor, in particular in terms of torque:

- The windings 37 can be mounted on each of the stator bars 31 and 31'. In order to optimize the space taken by these windings, each one is then positioned on the right or left half-zone in the stator zone ZS, alternating around the rotor shaft. The bars 31 and 31' can consequently be elbowed. They are then dissymmetrical, but the same bar, according to its mounting, can be used to support a winding of the right or left half-zone.

The section of each bar stator 31 or 31' is advantageously rounded, for example in the shape of an oval, which prevents sharp edges and facilitates the winding with an optimized diameter: the number of turns of a coil 35 are then increased for the same outer diameter, in comparison with a bar with square or rectangular section.

The stator bars 31 and 31' can be carried out differently that by a stacking of steel plates. In particular, the use of a magnetic material, as for example sintered steel, can make it possible to produce bars with rounded section, which is more difficult to carry out with steel plates.

The motor 1 such as described has a single output shaft. However, the structure can be carried out in a more symmetrical manner in order to make it possible to carry out a dual output shaft motor. The electronic control unit can be positioned on a single side.

Figure 7:
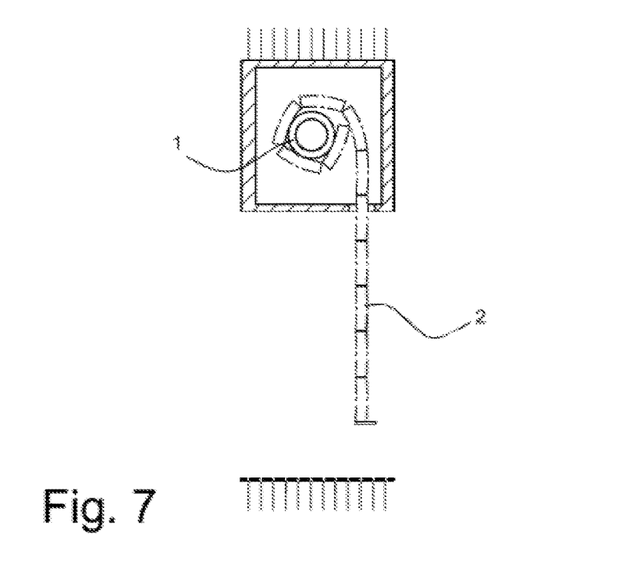
FIG. 7 is an end cross-section of a closure using the motor of the present invention.

The motor 1 described hereinabove is particularly advantageous for being used in a closing or sun protection installation. A closing or sun protection installation has a mobile screen 2, of the windable blind or Venetian blind type, even a door, grille or shutter, mobile at least between a deployed configuration wherein it blocks or shades an opening of a building and a wound position, wherein it releases the access to this opening. The motor 1 described hereinabove can easily be integrated into the winding shaft of such an installation, while still having a simplicity in mounting and operational reliability that are particularly attractive. This motor can easily be adapted to its conditions of use, by adjusting the axial length of the zone ZS, i.e. the length L35 of the coils 35, the diameter D22 or DR or the thickness of the discs 22a and 22b of the rotor.

The invention claimed is:

1. An electric motor comprising a rotor and a coiled stator, the rotor being rotatable around a rotation axis and comprising a shaft and two discs mounted fixed in rotation on the shaft and provided with permanent magnets, wherein one external portion of the stator extends along said rotation axis, on the permanent magnets of each disc and radially beyond the disc when starting from the rotation axis, wherein the stator comprises:
   a plurality of disjointed bars which are made of a magnetically conductive material and of which portions form the outer portion of the stator and
   a carrier structure maintaining the bars fixed in relation to each other, with the carrier structure being mounted rotatable around the shaft of the motor, rotatable on the shaft of the rotor, axially to the exterior of the two discs
wherein the external portion of the stator extends, parallel to the rotational axis of the rotor, axially to the exterior of the discs, up to the level of the carrier structure, and
   wherein an external maximum diameter of the electric motor, without casing, is substantially equal to an ideal diameter DI, which can be expressed as:

$$DI = DR + 2ES + 2E$$

wherein:
   DR is the maximum diameter of the rotor,
   2ES is twice the maximum thickness of an external portion of the stator, and
   2E is twice an airgap provided between the external portion of the stator and the magnets of the rotor.

2. The motor according to claim 1, wherein the permanent magnets are arranged with their direction of polarity oriented radially in relation to the rotational axis and the magnets of one of the discs are arranged in opposition in relation to the magnets of the other disc.

3. The motor according to claim 1, wherein the magnets are arranged on the external periphery of the discs of the rotor and the external periphery of the discs of the rotor is polygonal, having planar zones for the positioning of magnets of parallelepiped shape.

4. The motor according to claim 1, wherein sensors are arranged in an alternating manner, between two stator bars.

5. The motor according to claim 1, wherein at least some of the metal bars are elbowed and support coils, with the coils being at least partially inserted into a cylindrical space which is arranged, along the axis, between the discs of the rotor and which has a diameter equal to the diameter of these discs.

6. The motor according to claim 5, wherein the internal portion of the stator comprises at least one coil wound around a bar made of magnetic material which also defines one portion at least of the outer portion of the stator, wherein
   the bar supporting the coil is elbowed in a direction where it offsets the coil towards the rotational axis of the rotor, in relation to the outer portion of the stator,
   each coil is centred on an axis parallel to the rotational axis and offset radially in relation to the latter, each coil being arranged in an angular sector in relation to the rotational axis.

7. The motor according to claim 1, wherein the internal portion of the stator extends entirely in a cylindrical space arranged along the axis, between the discs and having a diameter equal to the outer diameter of the motor.

8. The motor according to claim 1, wherein the stator comprises metal bars, parallel to the rotational axis of the rotor and which do not support any coil.

9. The motor according to claim 1, wherein the stator comprises in alternation elbowed bars each supporting a coil offset towards the rotational axis and straight bars which support no coil.

10. The motor according to claim 1, wherein the carrier structure is in two portions axially nesting into one another, along the rotational axis of the rotor.

11. The motor according to claim 10 wherein the nested portions of the carrier structure include half-arms, some of which are nested, parallel to the rotational axis, in order to form arms surrounding at least partially some of the stator bars.

12. The motor according to claim 1, wherein the carrier structure is provided with localized recesses for the passage of portions of sensors and/or the maintaining of metal bars belonging to the stator.

13. The motor according to claim 1, wherein the carrier structure comprises studs surrounding a portion of certain metal bars at least, for the absorption of radial forces.

14. The motor according to claim 1, wherein it comprises at least one elastic seal, of which the outer diameter is larger than the outer diameter of the carrier structure, with the latter comprising at least one groove wherein the seal can be positioned.

15. The motor according to claim 1, wherein the bars have a section adapted to the magnets in such a way that a gap of substantially constant thickness is arranged between a bar and a magnet when they are facing each other.

16. The motor according to claim 1, wherein the metal bars are of two separate types, arranged alternating around the rotational axis.

17. The motor according to claim 16, wherein a first type of bar extends along a straight line parallel to the rotational axis of the rotor and a second type of bar comprises an external portion extending along a straight line parallel to the rotational axis of the rotor and an internal portion elbowed in relation to the external portion.

18. The motor according to claim 1, wherein the bars have at least one zone of lesser radial thickness, on their portion of positioning on the carrier structure and/or to the right of the discs of the rotor.

19. The motor according to claim 1, wherein the outer diameter of the carrier structure is less than or equal to the outer diameter of the stator.

20. An installation for closing or sun protection comprising a closing screen and a motorization unit, characterized in that the motorization unit comprises a motor according to claim 1.

* * * * *